J. W. BRYCE.
SYNCHRONIZING CLOCK SYSTEMS.
APPLICATION FILED MAY 13, 1920.
1,377,000.
Patented May 3, 1921.
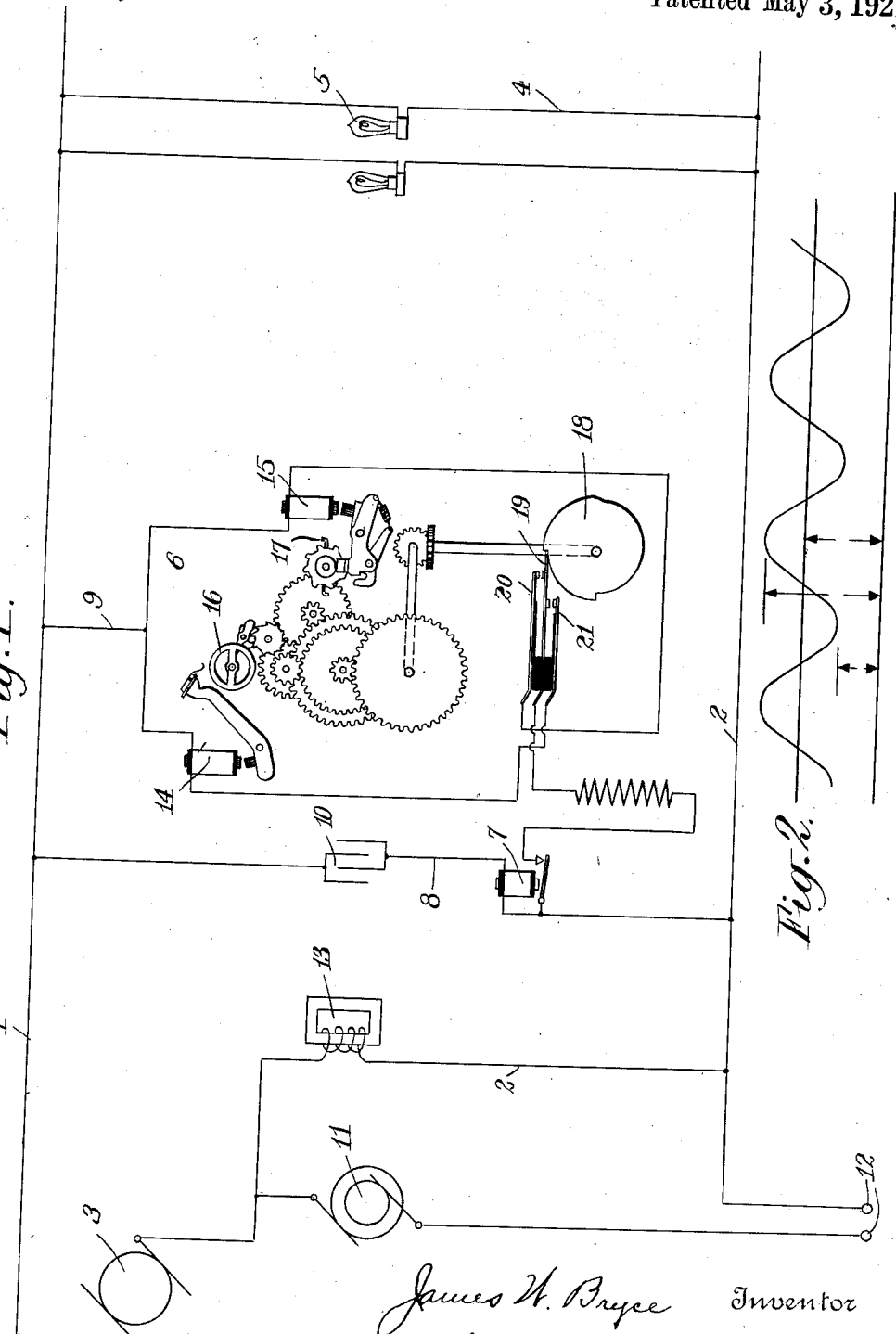
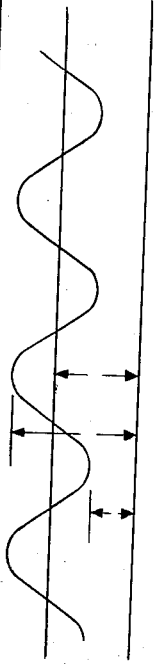
James W. Bryce  Inventor
By his Attorneys
Kerr, Page, Cooper & Hayward

UNITED STATES PATENT OFFICE.

JAMES W. BRYCE, OF BINGHAMTON, NEW YORK, ASSIGNOR TO THE INTERNATIONAL TIME RECORDING COMPANY OF NEW YORK, A CORPORATION OF NEW YORK.

SYNCHRONIZING CLOCK SYSTEMS.

1,377,000. Specification of Letters Patent. Patented May 3, 1921.

Application filed May 13, 1920. Serial No. 381,013.

*To all whom it may concern:*

Be it known that I, JAMES W. BRYCE, a citizen of the United States, residing at Binghamton, in the county of Broome and State of New York, have invented certain new and useful Improvements in Synchronizing Clock Systems, of which the following is a full, clear, and exact description.

The most expensive part of a local electric system is generally the wiring necessary for the installation. For example, in a time recording system, the clocks, the recorders and other accessories involve usually but a fraction of the total cost, while the main item of expense is in the conduits, the insulation and the conductors. It is manifest, therefore, that any means by which this cost of wiring may be reduced will have a great commercial value. Not only is the first cost a serious consideration, but it is frequently a most difficult and expensive proceeding to run new conduits, wires and the like in finished buildings and through finely furnished rooms such as offices, banks and the like.

In practically all such cases, however, an elaborate system of wiring for light, heat or power is primarily installed, and the object of the invention upon which the present application for Letters Patent is based is to provide a way by which such a system already installed may be readily and cheaply utilized for such other purposes as the operation of clocks, recorders, or other time controlled systems. The means which I have devised for this purpose secures greater flexibility in the recording system. As there are few places in a modern building which are not wired for electric lamps, and in the installation of the wiring for a time system the wires are usually run only to the points where clocks are required, and later any of the units have to be moved, this necessitates changes in the wiring that can only be effected at considerable expense and delay.

I have devised a means of synchronizing clocks particularly for use in such systems as are herein contemplated, at any part of an electric lighting or power system or on the entire system. For example a master clock with the proper synchronizing apparatus may be installed in the power house, and the entire system be utilized to synchronize secondary clocks without interfering in the least with its other uses or functions, or any branch of the circuit may be so equipped. It is possible, under my invention, to use a master clock to control clocks on one part of the system, and another master clock for controlling others on a different part of the circuit, either at the same or at different times should such be desirable.

In carrying out my invention I make use of the old and well known plan of superimposing a current of one character upon a circuit carrying a current of another kind, for example, an alternating current of relatively low voltage on a direct current circuit or conversely, but I accomplish this in a novel and effective way for my special purpose.

According to my invention I connect up the clocks to be synchronized with the main circuit at any desired point, in multiple, but the path across the mains which includes the devices to be operated is normally open. Adjacent to the clock I also establish a parallel path which is adapted to carry only the superimposed current and not the main current, and in this path is a relay which when current flows through the path closes a break in the clock circuit or circuits and thus effects the necessary and proper synchronizing operation.

In illustration, if the main circuit carries a direct current and an alternating current for synchronizing is superimposed thereon, then the cross circuit containing the relay includes a condenser which permits an alternating but not a direct current to flow over it.

This invention is illustrated in the accompanying drawing, in which—

Figure 1 is a diagram of the wiring for an electric lighting system, with a clock connected therewith and means for superimposing thereon and utilizing an alternating synchronizing current.

Fig. 2 is a diagram of the direct and superimposed alternating currents.

The numerals 1 and 2 designate the mains of an electric lighting plant supplied with direct current by a main generator 3. The lamps, motors or other translating devices 5 are connected as is usual in circuits 4 across the mains.

Let it be assumed that at any given point along this circuit it is desired to place a secondary clock 6. A cross circuit is connected to the mains at this point and carried to the mechanism in the clock that controls its rate and then to the back contact of a relay 7 included in a parallel branch 8 across the mains, so that the cross circuit 8 is operative only while the relay is energized.

The cross circuit 8 contains a condenser 10 so that an alternating current only and not a direct current can flow through it.

At any convenient point, for example at the power station, is an alternating current generator 11, one terminal of which is connected to one of the wires of the main circuit, and the other to a master clock, not shown in the drawing but designed to connect up to the terminals 12 one of which is connected to the wire 2. Between the point at which the generator 11 is connected to this wire and that at which the terminal 12 is connected is a reactance coil 13 of high inductance and low resistance which chokes the flow through it of alternating current, but does not interfere with the flow of direct current.

As is usual in such cases, the master clock closes the circuit between terminals 12 for the last fifteen minutes of each hour, so that during such intervals an alternating current is superimposed on the main circuit. If this current is of relatively low voltage say 10 volts, while that of the direct current is of the usual voltage of 110 volts, the resultant voltage in the circuit is not sensibly raised. The alternating current by reason of the inductance 13 is forced to follow the main leads and hence flows across the circuit 8. This energizes the relay 7 which is specially wired and designed to respond to the alternating current, and closes the circuit at one point through the clock.

In the present case the synchronizing means in the clock are those which I have shown and described in a prior Patent No. 1,310,779, dated July 22, 1919, and comprise two electromagnets 14 and 15; the former controls a brake which when the magnet is energized bears on the periphery of a balance wheel 16 and stops the same, and the latter controls a fan 17 normally locking the same but releasing it when the magnet is energized. The clock movement comprises a differential with the two members of which the usual escapement associated with the balance wheel 16, and which is normally operative, and the fan 17, are in gear.

The clock movement controls a cam 18 that permits a central contact 19 to engage either an upper contact 20 or a lower contact 21, so that should the clock be slow, the upper contact is engaged and the magnet 15 energized by the cam 18 before the expiration of the fifteen minutes during which the alternating current flows in the circuit and here the fan magnet receives current and the clock runs at a faster rate until it catches up with the master clock. On the contrary, if the clock is fast, then the contact 21 is engaged by the operation of the cam at the beginning of the period of alternating current flow and the stop magnet 14 is energized and the clock stopped until the master clock has caught up with it.

The features of novelty in the present case then reside in the means by which a current of different character superimposed on a given circuit is caused to control the operation of devices in the secondary clock or clocks which are directly dependent upon the main circuit for their operation. The main advantages of the system are that either an alternating current may be superimposed on a direct current circuit, and that the frequency of the alternating current is not a controlling or important factor, or that by means well understood in the art the main current may be alternating and the superimposed current direct.

What I claim is:—

1. The combination with an electric circuit of a secondary clock connected therewith in a normally open path, a source of current of different character from that flowing in the said circuit and means for superimposing such different current on the circuit, of a cross circuit which permits such different current only to flow through it, and means therein for closing or controlling the clock circuit, as herein set forth.

2. The combination with an electric circuit of any number of secondary clocks in normally open multiple paths connected therewith, a circuit connected with the main circuit, a generator of current of different character, a switch and a master clock controlling said switch connected therewith, whereby a current of different character from that in the main circuit may be superimposed at intervals thereon, a cross circuit over which current only of such different character may pass, and means therein for controlling the normally open multiple paths through the clocks for the purpose described.

3. The combination with an electric circuit of a continuous current generator translating devices and secondary clocks in multiple therewith, of a master clock controlled circuit connected therewith, an alternating current generator therein, a reactance connected with the circuit for forcing the alternating current, when flowing, to follow the main circuit leads, branch circuits, a condenser and a relay in each and connections by means of which said relay controls the adjacent multiple clock circuits and the operation of synchronizing devices therein.

In testimony whereof I hereunto affix my signature.

JAMES W. BRYCE.